United States Patent
Jenko

(10) Patent No.: US 8,678,802 B2
(45) Date of Patent: Mar. 25, 2014

(54) HOT-RUNNER SYSTEM HAVING MANIFOLD ASSEMBLY MANUFACTURED IN ACCORDANCE WITH FREE-FORM-FABRICATION

(75) Inventor: Edward Joseph Jenko, Essex, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 36 days.

(21) Appl. No.: 13/511,222

(22) PCT Filed: Oct. 21, 2010

(86) PCT No.: PCT/US2010/053518
§ 371 (c)(1),
(2), (4) Date: May 22, 2012

(87) PCT Pub. No.: WO2011/071601
PCT Pub. Date: Jun. 16, 2011

(65) Prior Publication Data
US 2012/0237631 A1    Sep. 20, 2012

Related U.S. Application Data

(60) Provisional application No. 61/267,581, filed on Dec. 8, 2009.

(51) Int. Cl.
*B29C 45/22* (2006.01)
(52) U.S. Cl.
USPC .......................................... 425/130; 425/572
(58) Field of Classification Search
USPC .................................. 425/130, 572
See application file for complete search history.

(56) References Cited

U.S. PATENT DOCUMENTS

| | | | |
|---|---|---|---|
| 4,599,064 A * | 7/1986 | Landis et al. | 425/185 |
| 4,831,230 A | 5/1989 | Lemelson | |
| 4,964,795 A * | 10/1990 | Tooman | 425/144 |
| 5,374,178 A * | 12/1994 | Nakayama | 425/130 |
| 5,641,448 A | 6/1997 | Yeung et al. | |
| 5,775,401 A | 7/1998 | Sachs et al. | |
| 6,036,469 A * | 3/2000 | Allen et al. | 425/192 R |
| 6,062,840 A * | 5/2000 | Lee et al. | 425/130 |
| 6,526,327 B2 | 2/2003 | Kar et al. | |
| 6,694,207 B2 | 2/2004 | Darrah et al. | |
| 7,040,378 B2 | 5/2006 | Gellert et al. | |
| 7,047,098 B2 | 5/2006 | Lindemann | |
| 7,223,092 B2 * | 5/2007 | Fischer et al. | 425/549 |
| 7,234,930 B2 | 6/2007 | Niewels et al. | |
| 2004/0079511 A1 | 4/2004 | Gellert et al. | |
| 2004/0169699 A1 | 9/2004 | Hunter et al. | |
| 2005/0051920 A1 | 3/2005 | Thomson | |
| 2005/0186538 A1 | 8/2005 | Uckelmann | |
| 2006/0003039 A1 | 1/2006 | Bouti | |
| 2006/0003041 A1 | 1/2006 | Rosner | |
| 2006/0204611 A1 | 9/2006 | Serniuck et al. | |
| 2009/0274790 A1 | 11/2009 | Jenko et al. | |

FOREIGN PATENT DOCUMENTS

EP        00863806 B1    7/2002

OTHER PUBLICATIONS

International Search Report, 3 pages.

* cited by examiner

*Primary Examiner* — Tim Heitbrink

(57) ABSTRACT

A hot-runner system (100), comprising: a manifold assembly (102), including: a manifold body (104) defining a melt channel (109, 110) being smooth-flowing, direction-changing and uninterrupted.

20 Claims, 10 Drawing Sheets

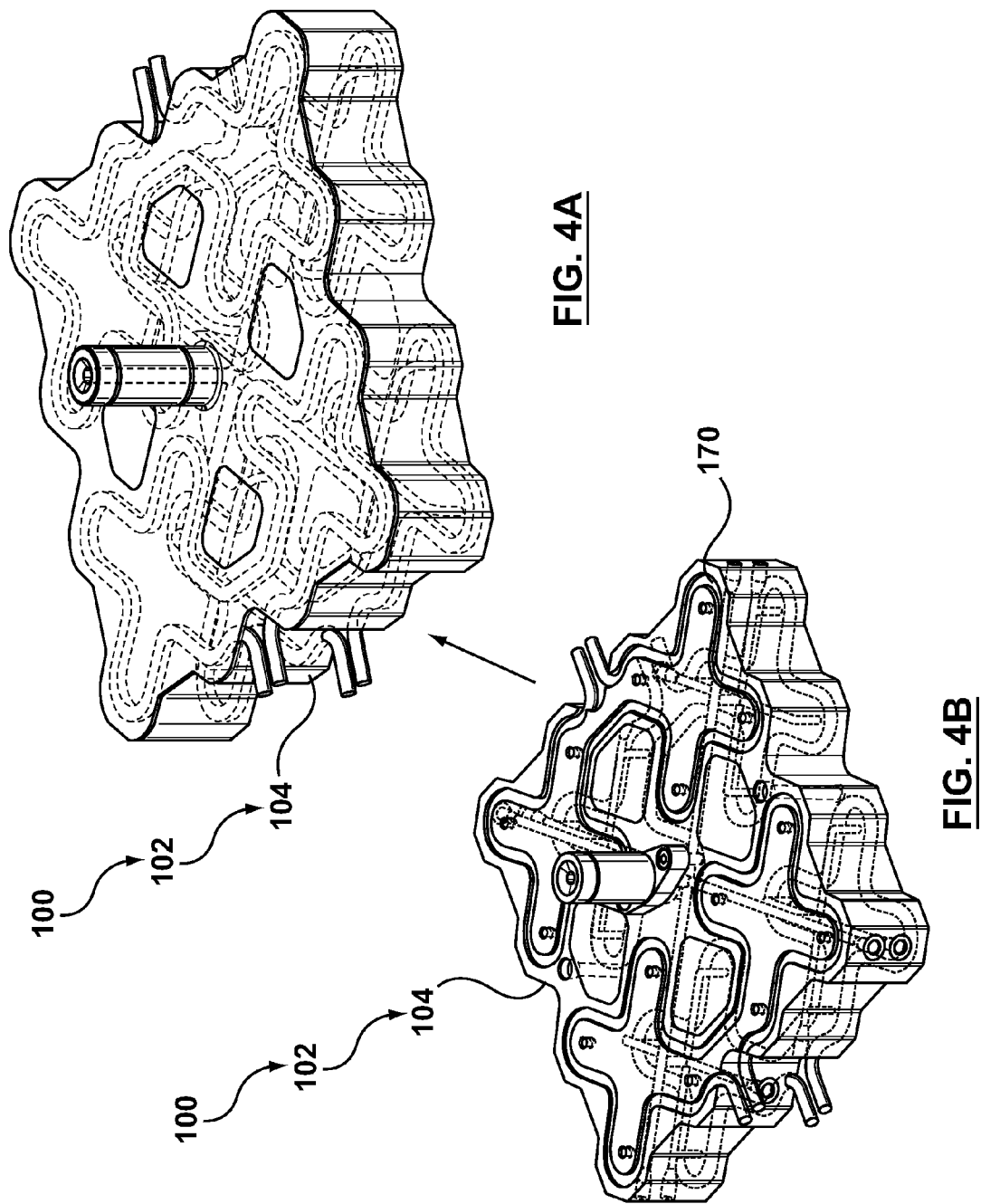

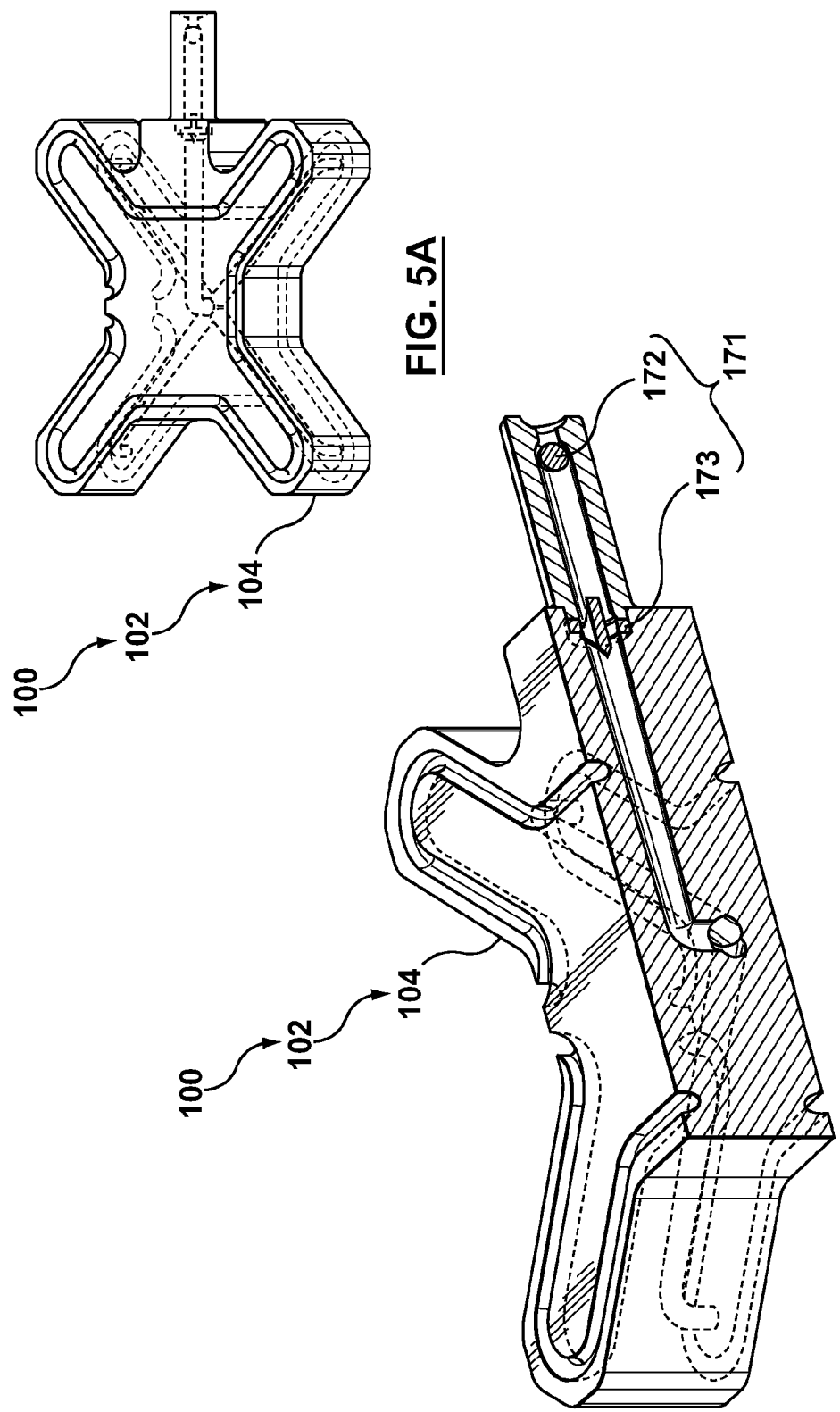

Figure 1:
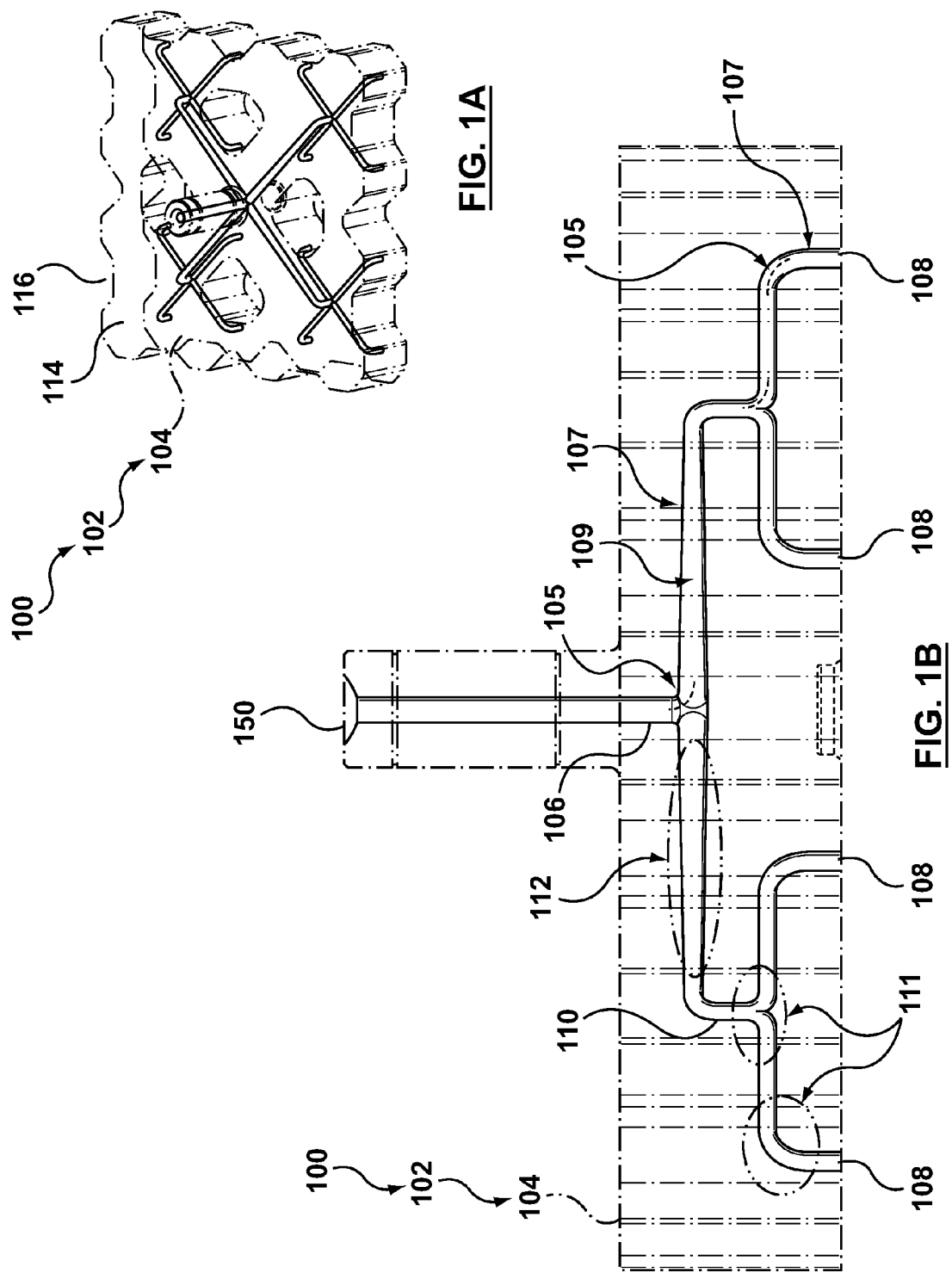

HOT-RUNNER SYSTEM HAVING MANIFOLD ASSEMBLY MANUFACTURED IN ACCORDANCE WITH FREE-FORM-FABRICATION

TECHNICAL FIELD

Embodiments of the present invention generally relate to hot-runner systems used in molding systems.

BACKGROUND

The first man-made plastic was invented in Britain in 1851 by Alexander PARKES. He publicly demonstrated it at the 1862 International Exhibition in London, calling the material Parkesine. Derived from cellulose, Parkesine could be heated, molded, and retain its shape when cooled. It was, however, expensive to produce, prone to cracking, and highly flammable. In 1868, American inventor John Wesley HYATT developed a plastic material he named Celluloid, improving on PARKES' invention so that it could be processed into finished form. HYATT patented the first injection molding machine in 1872. It worked like a large hypodermic needle, using a plunger to inject plastic through a heated cylinder into a mold. The industry expanded rapidly in the 1940s because World War II created a huge demand for inexpensive, mass-produced products. In 1946, American inventor James Watson HENDRY built the first screw injection machine. This machine also allowed material to be mixed before injection, so that colored or recycled plastic could be added to virgin material and mixed thoroughly before being injected. In the 1970s, HENDRY went on to develop the first gas-assisted injection molding process.

Injection molding machines consist of a material hopper, an injection ram or screw-type plunger, and a heating unit. They are also known as presses, they hold the molds in which the components are shaped. Presses are rated by tonnage, which expresses the amount of clamping force that the machine can exert. This force keeps the mold closed during the injection process. Tonnage can vary from less than five tons to 6000 tons, with the higher figures used in comparatively few manufacturing operations. The total clamp force needed is determined by the projected area of the part being molded. This projected area is multiplied by a clamp force of from two to eight tons for each square inch of the projected areas. As a rule of thumb, four or five tons per square inch can be used for most products. If the plastic material is very stiff, it will require more injection pressure to fill the mold, thus more clamp tonnage to hold the mold closed. The required force can also be determined by the material used and the size of the part, larger parts require higher clamping force. With Injection Molding, granular plastic is fed by gravity from a hopper into a heated barrel. As the granules are slowly moved forward by a screw-type plunger, the plastic is forced into a heated chamber, where it is melted. As the plunger advances, the melted plastic is forced through a nozzle that rests against the mold, allowing it to enter the mold cavity through a gate and runner system. The mold remains cold so the plastic solidifies almost as soon as the mold is filled.

Mold assembly or die are terms used to describe the tooling used to produce plastic parts in molding. The mold assembly is used in mass production where thousands of parts are produced. Molds are typically constructed from hardened steel, etc. Hot-runner systems are used in molding systems, along with mold assemblies, for the manufacture of plastic articles. Usually, hot-runners systems and mold assemblies are treated as tools that may be sold and supplied separately from molding systems.

U.S. Pat. No. 4,831,230 (Inventor: LEMELSON, Jerome H.; Filed: Nov. 26, 1986) discloses "an apparatus and method for shaping and surface finishing articles and material of manufacture by means of intense radiation."

U.S. Pat. No. 4,929,402 (Inventor: HULL, Charles W.; Filed: 19 Apr. 1989) discloses "a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction, successive adjacent laminae, representing corresponding successive adjacent cross-sections of the object, being automatically formed and integrated together to provide a step-wise laminar buildup of the desired object, whereby a three-dimensional object is formed and drawn from a substantially planar surface of the fluid medium during the forming process."

U.S. Pat. No. 4,575,330 (Inventor: HULL, Charles W; Filed: 8 Aug. 1984) discloses "a system for generating three-dimensional objects by creating a cross-sectional pattern of the object to be formed at a selected surface of a fluid medium capable of altering its physical state in response to appropriate synergistic stimulation by impinging radiation, particle bombardment or chemical reaction, successive adjacent laminae, representing corresponding successive adjacent cross-sections of the object, being automatically formed and integrated together to provide a step-wise laminar buildup of the desired object, whereby a three-dimensional object is formed and drawn from a substantially planar surface of the fluid medium during the forming process."

U.S. Pat. No. 5,204,055 (Inventor: SACHS, Emanuel M., et al.; Filed: 8 Dec. 1989) discloses "a process for making a component by depositing a first layer of a fluent porous material, such as a powder, in a confined region and then depositing a binder material to selected regions of the layer of powder material to produce a layer of bonded powder material at the selected regions. Such steps are repeated a selected number of times to produce successive layers of selected regions of bonded powder material so as to form the desired component. The unbonded powder material is then removed. In some is cases the component may be further processed as, for example, by heating it to further strengthen the bonding thereof."

U.S. Pat. No. 5,121,329 (Inventor: CRUMP, Scott S., Filed: 30 Oct. 1989) discloses "apparatus incorporating a movable dispensing head provided with a supply of material which solidifies at a predetermined temperature, and a base member, which are moved relative to each other along "X," "Y," and "Z" axes in a predetermined pattern to create three-dimensional objects by building up material discharged from the dispensing head onto the base member at a controlled rate. The apparatus is preferably computer driven in a process utilizing computer aided design (CAD) and computer-aided (CAM) software to generate drive signals for controlled movement of the dispensing head and base member as material is being dispensed. Three-dimensional objects may be produced by depositing repeated layers of solidifying material until the shape is formed. Any material, such as self-hardening waxes, thermoplastic resins, molten metals, two-part epoxies, foaming plastics, and glass, which adheres to the previous layer with an adequate bond upon solidification, may be utilized. Each layer base is defined by the previous layer, and each layer thickness is defined and closely controlled by the height at which the tip of the dispensing head is positioned above the preceding layer."

U.S. Pat. No. 5,775,402 (filed: Oct. 31, 1995; Inventor: Emanuel SACHS) discloses a processes for providing enhanced thermal properties of tooling, particularly metal and metal/ceramic molds, made by solid free form fabrication techniques, such as the three dimensional printing process, and the tooling made by these processes are disclosed. The methods of enhancing thermal properties include incorporating integral contour coolant channels into the mold, adding surface textures to the coolant channels, creating high thermal conductivity paths between the surfaces and the coolant channels, and creating low thermal inertia regions in the mold.

European Patent Number 0863806 (Inventor: FREITAG, et al.; Filed: 26 Nov. 1996) discloses "manufacturing of solid three-dimensional articles, and is more specifically directed to the additive fabrication of metal articles such as parts and mold dies."

U.S. Pat. No. 7,047,098 (Inventor: LINDEMANN, Markus, et al.; Filed: 21 Feb. 2002) discloses "a process for producing a shaped body by selective laser melting, in which a shaped body is built up from pulverulent metallic material using CAD data of a model, in which a powder layer is applied using an applicator unit, and in which the applied powder layer is fixed to a layer below it using a focused laser beam, in which process the powder layer is leveled to a desired layer thickness as a result of a leveling device passing over the shaped body at least once, and during the leveling elevations that project above the desired layer height of the applied powder, of the layer which was last melted by the laser beam are uncovered by the leveling device."

U.S. Pat. No. 7,381,360 (Inventor: ORIAKHI, Christopher, et al.; Filed: 3 November 2003) discloses "compositions, methods, and systems for solid free-form fabrication of three-dimensional objects."

U.S. Pat. No. 7,220,380 (Inventor: FARR, Isaac, et al.; Filed: 14 Oct. 2003) discloses "a method for solid free-form fabrication of a three-dimensional metal object includes depositing a particulate blend in a defined region, the particulate blend including a number of metal or metal alloy particulates and a peroxide, and selectively ink-jetting a binder system onto a predetermined area of the particulate blend to form a green part, wherein the liquid phase binder includes a water soluble monofunctional acrylate-based monomer, a water soluble difunctional acrylate-based monomer, an amine, and water."

United States Patent Publication Number: 2004/0079511 and U.S. Pat. No. 6,701,997 (filed 17 Jun. 2002; Inventor: GELLERT, Jobst U, et al.) discloses: "(i) a process for fabricating an injection molding component having an electrical heating attached thereto, the process comprising the steps of: contacting the electrical heating element with a powdered metal preform having at least partial open porosity, the powdered metal preform being composed of a first metal; contacting the preform adjacent a region of the open porosity with a mass of a second metal, the second metal having higher thermal conductivity than the first metal; heating the preform, the heating element and the mass so as to cause the second metal to at least partially infiltrate the open porosity of the preform and at least partially join the heating element to the preform when cooled, (ii) a process for fabricating a metal part having at least two components, the process comprising the steps of: making a powdered preform of a first component, the preform having at least partial open porosity; contacting a second component with the preform of the first component; and infiltrating the open porosity of preform with a second metal wherein the second component is brazed to the first component by the second metal substantially contemporaneously with the infiltration step, (iii) a process for fabricating a metal part having at least two components, the process comprising the steps of: making a powdered preform of a first component, the preform having at least partial open porosity; contacting a second component with the preform of the first component to form an assembly thereof; contacting the preform first component with a mass of a metal infiltrant; controllably heating the assembly and the metal infiltrant to melt the metal infiltrant; holding the assembly and the metal infiltrant at temperature until the open porosity of the preform of the first component is at least partially infiltrated by the metal infiltrant and the second component is at least partially brazed to the first component by the metal infiltrant; and controllably cooling the assembly to solidify the metal infiltrant, and (iv) a process for fabricating an injection molding component, the process comprising the steps of: mixing a powdered tool steel with a binder to form an admixture; injecting the admixture into a preform; debinderizing the preform; partially sintering the preform to achieve 40% to 10% volume open porosity therein; contacting the preform with a metal infiltrant, the metal infiltrant having high thermal conductivity; controllably heating the preform and the metal infiltrant to at least the melting temperature of the metal infiltrant; holding the preform and the metal infiltrant at temperature until the porosity of the first component is at least partially infiltrated by the metal infiltrant, and cooling the preform to solidify the metal infiltrant and yield the injection molding component."

United States Patent Publication Number 2004/0169699 (Inventor: HUNTER, Shawn, et al.; Filed: 28 Feb. 2003) discloses "a method of producing an object through solid freeform fabrication, said method comprising applying two immiscible fluids to a build material."

U.S. Pat. No. 7,234,930 (Inventor: NIEWELS, et al; Filed: 14 Jun. 2004) discloses "a second piece is formed by a three-dimensional printing process or other powder forming technique such as investment casting. The three dimensional printing process or other powder forming techniques permit the formation of ideal cooling channels within the structure. This provides a neck ring half with high strength provided by the first piece and high thermal conductivity provided by the second piece."

U.S. Pat. No. 7,326,377 (Inventor: ADAMS, Robbie J; Filed: 30 Nov. 2005) discloses "a solid free form fabrication system for manufacturing a component by successively building feedstock layers representing successive cross-sectional component slices includes a platform for receiving and supporting the feedstock layers, a feedstock supplying apparatus that deposits the feedstock into a predetermined region to form the feedstock layers, an energy source directed toward the predetermined region to modify the feedstock in the predetermined region and thereby manufacture the component, and a temperature control block disposed on the platform and directly in contact with the deposited feedstock layers to modify the feedstock temperature while manufacturing the component. A solid free form fabrication method uses the system to manufacture the component from the feedstock material."

United States Patent Publication Number 2005/0186538 (Inventor: UCKELMANN, Ingo; Filed: 24 Feb. 2005) discloses "a method for making metallic and/or non-metallic products 2, in particular dental products, by freeform sintering and/or melting."

United States Patent Publication Number: 2009/0108500 (filing date: 31 Oct. 2007, inventor: Edward Joseph JENKO) discloses "Additionally, a low strength manifold, such as one made with low grade steel or through free form fabrication, can be used in the production of such molded pieces requiring high pressure injection.

United States Patent Publication number: US 2009/0192835 (filing date: 24 Jan. 2008; Inventor: Martin H. BAUMANN et al) discloses at paragraph [0023] "Additionally, a low strength manifold, such as one made with low grade steel or through free form fabrication, can be used in the production of such molded pieces requiring high pressure injection."

A technical journal titled: HIGH PERFORMANCE PLASTICS (Issue: October 2005 on page 5; Title of Article: FREEFORM FABRICATION FOR PROTOTYPING) discloses "US researchers are developing an automated prototyping process in which an advanced composite is formed into a freestanding, three-dimensional object. The technique—called composite layer manufacturing (CLM)—does not require moulds, dies or other tooling. In addition, there is usually no need for machining, as the process creates netshapes, the developers say."

A technical journal titled: ADVANCED COMPOSITES BULLETIN (Issue: October 2005 on page: 10; Title of Article: SOLID FREE-FORM FABRICATION OF REINFORCED PLASTICS) discloses: "US researchers are developing an automated prototyping process in which an advanced composite is formed into a freestanding, three-dimensional object. The technique—called composite layer manufacturing (CLM)—does not require moulds, dies or other tooling. In addition, there is usually no need for machining, as the process creates netshapes, the developers say."

A technical publication titled: HOT RUNNERS—PLATE FUSING TECHNOLOGY FOR DESIGNING AND BUILDING MANIFOLDS (Publication Date: April 2007; Author: Gilbert Chan; Publication: www.moldmakingtechnology.com) discloses how plate fusing technology can benefit the mold designer and mold maker. Specifically, most hot runner manifolds are plug style manifolds where the manifold starts out as a solid plate of steel and straight flows are gun drilled into the plate to create intersecting flow channels. Hot runner channel plugs are then used to plug the drilled holes and to create the final flow path. Manifolds manufactured in this fashion are limited to straight flows, hard 90-degree turns in flow, and typically contain steps between the flow channels and the plugs, which can create hold up areas for the material. A secondary operation to polish the manifold channel intersections involves using a slurry to smooth the flow surfaces, but because this is a blind method, smooth flows without steps are not always guaranteed. The plate-fusing technology provides a method for building a manifold. As the name suggests, plate fusing technology uses separate steel plates that are fused together to create a solid manifold. The process starts out with two or more plates. Flow channels are machined in the faces of the steel. These will become the internal surfaces of the manifold melt channel. These channels will be machined on a CNC (computer numerical control) mill with ball end mills to produce smooth, rounded flow channels with flowing radii at the transitions in the x-y plane but not in the z plane. The channels can vary in size and can travel between the levels of the plates but transitions from x-y plane to the z plane will still have abrupt or "hard" 90-degree turns. These channels will be machined on a CNC (Computer Numerical Control) mill with ball end mills to produce smooth, rounded flow channels with flowing radii at the transitions. Also, smooth radii in the x-y plane are used.

United States Patent Publication Number 2004/0079511 (Inventor: Gellert) discloses, in FIG. 17, smooth radii in the z plane are used.

SUMMARY OF THE INVENTION

It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted).

The present invention seeks to provide an improvement over the state of the art.

According to an aspect, there is provided a hot-runner system (100), comprising: a manifold assembly (102), including: a manifold body (104) defining a melt channel (109, 110) being smooth-flowing, direction-changing and uninterrupted.

These and other aspects and features of non-limiting embodiments of the present invention will become apparent to those skilled in the art upon review of the following description of specific non-limiting embodiments of the invention in conjunction with the accompanying drawings.

DETAILED DESCRIPTION OF THE DRAWINGS

The invention and its embodiments will be more fully appreciated by reference to the following detailed description of illustrative (non-limiting) embodiments in accordance with the present invention when taken in conjunction with the accompanying drawings, in which:

FIGS. 1A, 1B, 2A, 2B, 3, 4A, 4B, 5A, 5B, 6A, 6B, 7A, 7B, 8 depict schematic representations of a hot-runner system (100).

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

FIGS. 1A and 1B depict a schematic representation of the hot-runner system (100). The hot-runner system (100) includes (but is not limited to): a manifold assembly (102). The manifold assembly (102) includes (but is not limited to): a manifold body (104) defining a melt channel (109, 110) being smooth-flowing, direction-changing and uninterrupted. An example of a manufacturing method for making the manifold body (104) is to use a solid freeform fabrication. The manifold body (104) may be manufactured, at least in part, in accordance with an additive manufacturing fabrication process, which may also be referred to as a "solid freeform fabrication process". Solid freeform fabrication is a collection of techniques for manufacturing solid objects by the sequential delivery of energy and/or material to specified points in space to produce that solid. SFF is sometimes referred to as rapid prototyping, rapid manufacturing, layered manufacturing and additive fabrication. It will be appreciated that SFF is sometimes referred to as Free Form manufacturing (FFF). The following are the techniques for (SFF): (A) Electron beam melting (fully fused void-free solid metal parts from powder stock), (B) Electron beam freeform fabrication (fully fused void-free solid metal parts from wire feedstock), (C) Fused deposition modeling (fused deposition modeling extrudes hot plastic through a nozzle, building up a model), (D) Laminated object manufacturing (sheets of paper or plastic film are attached to previous layers by either sprayed glue, heating, or embedded adhesive, and then the desired outline of the layer is cut by laser or knife. Finished product typically looks and acts like wood), (E) Laser engineered net shaping (a laser is used to melt metal powder and deposit it on the part directly. This has the advantage that the part is fully solid (unlike SLS) and the metal alloy composition can be dynamically changed over the volume of the part), (F) Polyjet matrix (PolyJet Matrix Technology is the first technology that enables simultaneous jetting of multiple types of model materials), (G) Selective laser sintering (selective laser sintering uses a laser to fuse powdered nylon, elastomer, or metal. Additional processing is necessary to produce fully dense metal part), (H) Shape deposition manufacturing (part and support material are deposited by a printhead and then machined to near-final shape), (I) Solid ground curing (shines a UV light on an electrostatic mask to cure a layer of photopolymers, uses solid wax for support), (J) Stereolithography (stereolithography uses a laser to cure liquid photopolymers), (K) Three-dimensional printing (this label encompasses many technologies of modern 3D Printers, all of which use inkjet-like printheads to deposit material in layers. Commonly, this includes (but is not limited to) thermal phase change inkjets and photopolymer phase change inkjets), and/or (L) Robocasting (robocasting refers to depositing material from a robotically controlled syringe or extrusion head). Another example of a manufacturing method for making the manifold body (104) is to use a non-solid freeform fabrication, such as casting. Casting is a manufacturing process by which a liquid material is usually poured into a mold, which contains a hollow cavity of the desired shape, and then allowed to solidify. The solidified part is also known as a casting, which is ejected or broken out of the mold to complete the process. Casting materials are usually metals or various cold setting materials that cure after mixing two or more components together; examples are epoxy, concrete, plaster and clay. Casting is most often used for making complex shapes that would be otherwise difficult or uneconomical to make by other methods.

FIG. 1B depicts the hot-runner system (100) wherein the manifold body (104) defines: (i) a melt-channel inlet (106), and (ii) melt-channel outlets (108) communicating with the melt-channel inlet (106), in which at least one of the melt-channel inlet (106) and the melt-channel outlets (108) has a curved centerline axis (105). The melt-channel outlets (108) are offset from the melt-channel inlet (106). At least one of the melt-channel inlet (106) and the melt-channel outlets (108) includes a tapered channel wall (107). In addition, the manifold body (104) defines melt channels (109) extending between the melt-channel inlet (106) and the melt-channel outlets (108), and at least one of the melt channels includes the tapered channel wall (107). The manifold body (104) also defines a melt channel (110) that extends, at least in part, between the melt-channel inlet (106) and the melt-channel outlet (108). The melt channel (110) includes (but is not limited to): a contoured-melt channel portion (112), which may be called a contoured shape. The melt channel (109) and/or the melt channel (110) includes: a centerline axis with a curve having a radius greater than the diameter of the melt channel (109) and/or the melt channel (110). The intersections (111) between portions of the melt channels are smooth intersections. A sprue structure (150) is also depicted. It is understood that contoured may also include (but is not limited to) "tapered", curved or any non-round or non-cylindrical shape. Contoured and tapered melt channels have a benefit, such as constant plastic shear rate during injection, smooth flow path without machining and much shorter flow path/residence time. Smooth transitions between channel intersections and tapers from one diameter to another along their length can allow control over shear rate of resin flow. Smooth melt channel paths reduce plastic hang-ups, thereby speeding up plastic color changes during operation. Also, since plastic degrades with time and temperature, eliminating potential hang-ups and reducing the volume of the plastic in the manifold by forming shorter, more direct channels, decreases the likelihood of plastic degradation. Maintaining a constant plastic shear rate during injection is also advantageous, compared to conventional channel manufacturing. By manipulating the size and shape of channels and intersections a constant shear rate or deliberate shear rate can be created. This is in contrast to conventional manifold melt channels, where the shear rate is compromised by the limitation of available tooling sizes and shapes that can be manufactured using the subtractive machining process. The melt channel (109, 110) includes a channel wall having contours which, in use, mixes a melt flow when the melt is made to flow through the melt channel (109, 110). The manifold body (104) forms a void configured to alter a thermal uniformity of the manifold body.

Preferably, the melt channel (110) is plugless. Free form fabrication can be used to manufacture a manifold having no melt channel plugs. The benefit for this arrangement would be: fewer parts and manufacturing operations, fewer interfaces to leak and the elimination of fitting plugs into melt channels.

The manifold body (104) may include (but is not limited to) a functionally-graded material. The functionally-graded material may be (for example) a high-thermal conductivity layer, a low thermal conductivity layer, wear-resistant material, a corrosion-resistant material, etc. The benefit for this arrangement is thermally and structurally optimized material performance, maintaining the plastic melt at a constant isothermal temperature.

The manifold body (104) defines an outer surface (114) having a contoured shape (116). The manifold body (104) has a non-flat contoured external surface. The benefit for this arrangement is smaller manifold, less material consumption, even thermal transfer to melt channel, utilizing plasma spray heating technology.

The manifold body (104) can define a melt channel (110) having an extremely small, for example, 4 millimeter (mm) diameter or less. Drilling such small holes that are straight and long is a manufacturing challenge. Generally, drilling a small hole (4 mm or smaller) that is longer than 50 times the diameter of the hole results in a terminating point that is significantly out of position due to drill wander. Making smooth and accurate intersections is a problem and the manufacturing time to improve the result is expensive and time consuming. Using the additive process permits the multi-fold benefit of infinitely sized channels unachievable today through machining processes, gently curved channel axis, smooth intersections and reduced channel volumes. The resulting low residence time, degradation and color change times result in a far higher (better) performance.

The manifold body (104) defines a selected hot-runner component that may be selected from any one of bushing, nozzle housing, etc. SFF may be used to incorporate sprue bushings and nozzle housings into a unitized manifold. The benefit for this arrangement is no sliding surfaces required due to temperature increase. Also, by using SFF, components, such as a bushing, may be incorporated into the manifold body (104) as a feature integral with the manifold body (104), thereby reducing parts count while preserving smooth melt turns or other special features/geometries of a bushing, etc.

Figure 2:
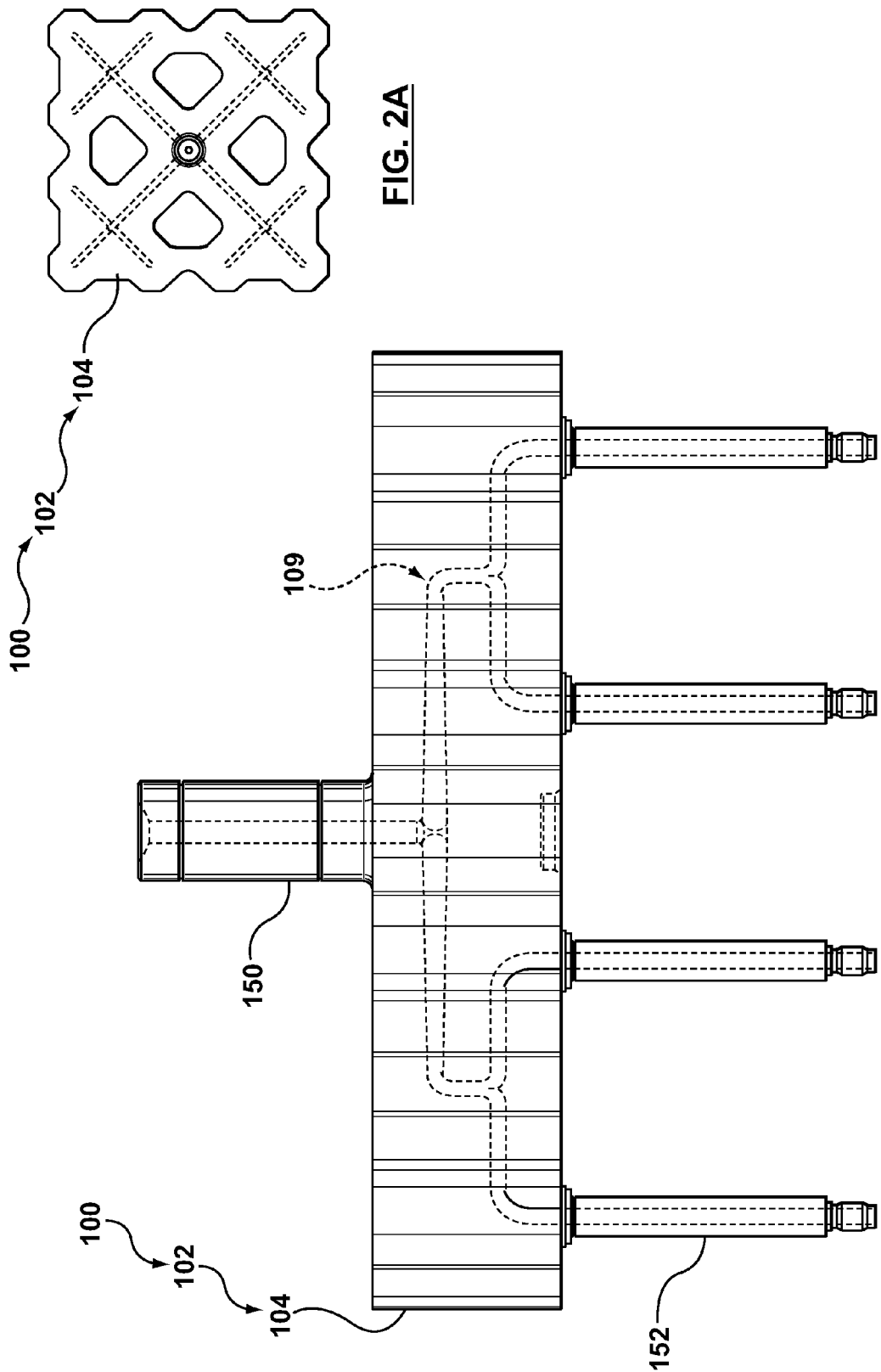

Referring to FIGS. 2A and 2B, the manifold body (104) includes (but is not limited to): the sprue structure (150) and nozzles (depicted in FIG. 2B) that are integral of the manifold body (104), reducing component quantity & possible leakage interfaces. The manifold body (104) includes (but is not limited to): a nozzle structure (152) being integral geometry of the manifold body (104), reducing component quantity & possible leakage interfaces.

Figure 3:
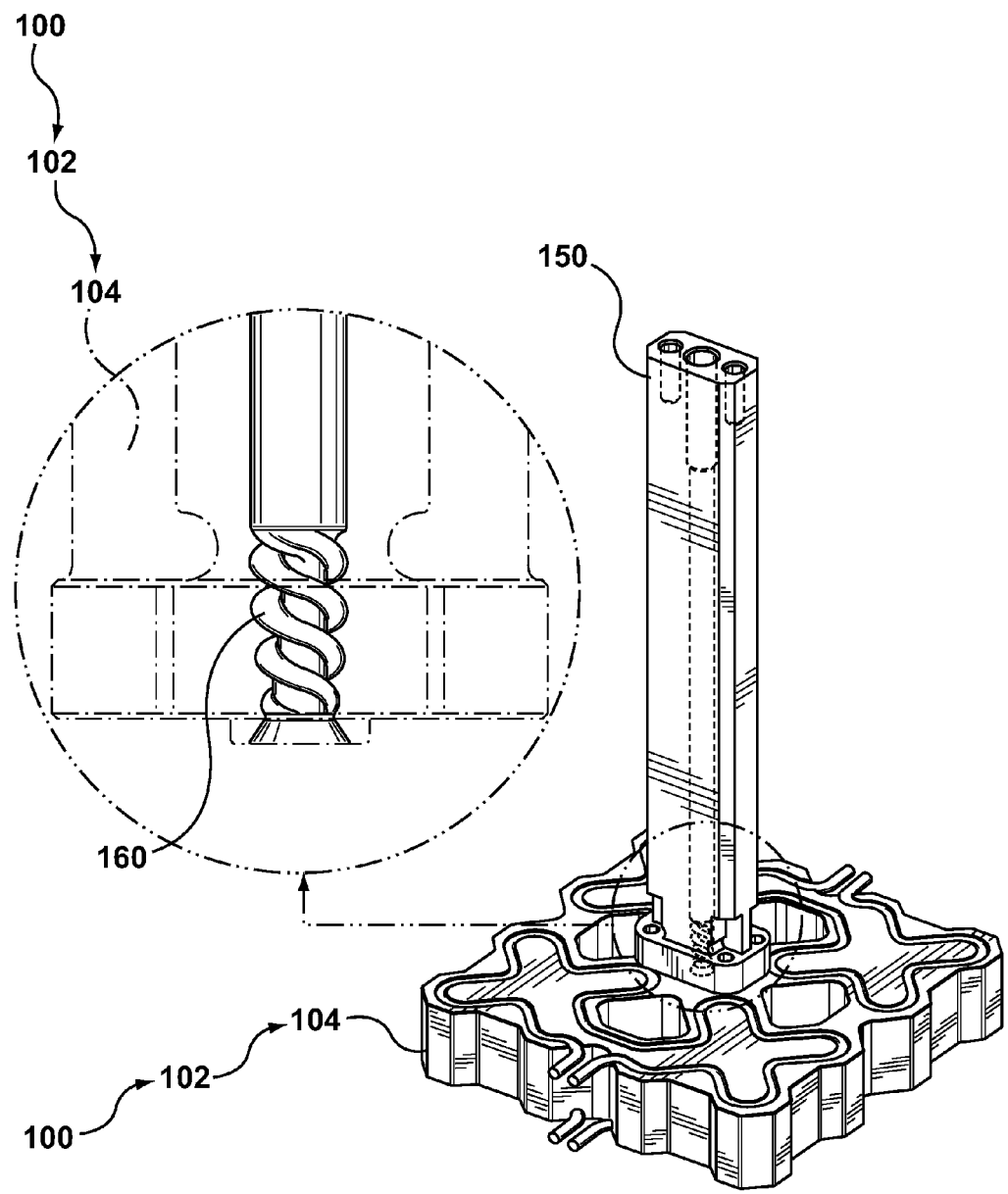

Referring to FIG. 3, the manifold body (104) further includes (but is not limited to): a convoluted melt-channel geometry 160. Shear heating of the melt flow can cause flow imbalance as the resin reaches melt channel intersections. The longer the melt channel, the more shearing is experienced. In a sprue bar or other long melt channels, it may be desirable to homogenize the melt flow entering the intersecting melt channels by mixing the resin through convoluted melt-channel geometry 160. This complex geometry cannot be machined into a monolithic manifold body and would typically be incorporated into a manifold using multiple inserts requiring assembly & creating possible leakage interfaces.

Referring to FIGS. 4A and 4B, the manifold body (104) includes (but is not limited to): a component (170) being captured (embedded) within the manifold body (104). By using SFF, various components can be captured (or embedded) within the manifold body (104). For example, using SFF techniques allows one or more heaters to be fully captured within the manifold material of the manifold body (104), thereby increasing the efficiency of the heater.

Referring to FIGS. 5A and 5B, the manifold body (104) includes (but is not limited to): a moving component (171) being captured (embedded) within the manifold body (104). For example, the moving component (171), such as a ball (172) for a check valve, is incorporated within the manifold body (104) or in the sprue structure (150). A ball stop (173) is integrated to the manifold body (104), and is used to stop the travel of the ball (172). It will be appreciated that a molding system can include (but is not limited to) the hot-runner system (100) described above.

Figure 6A:
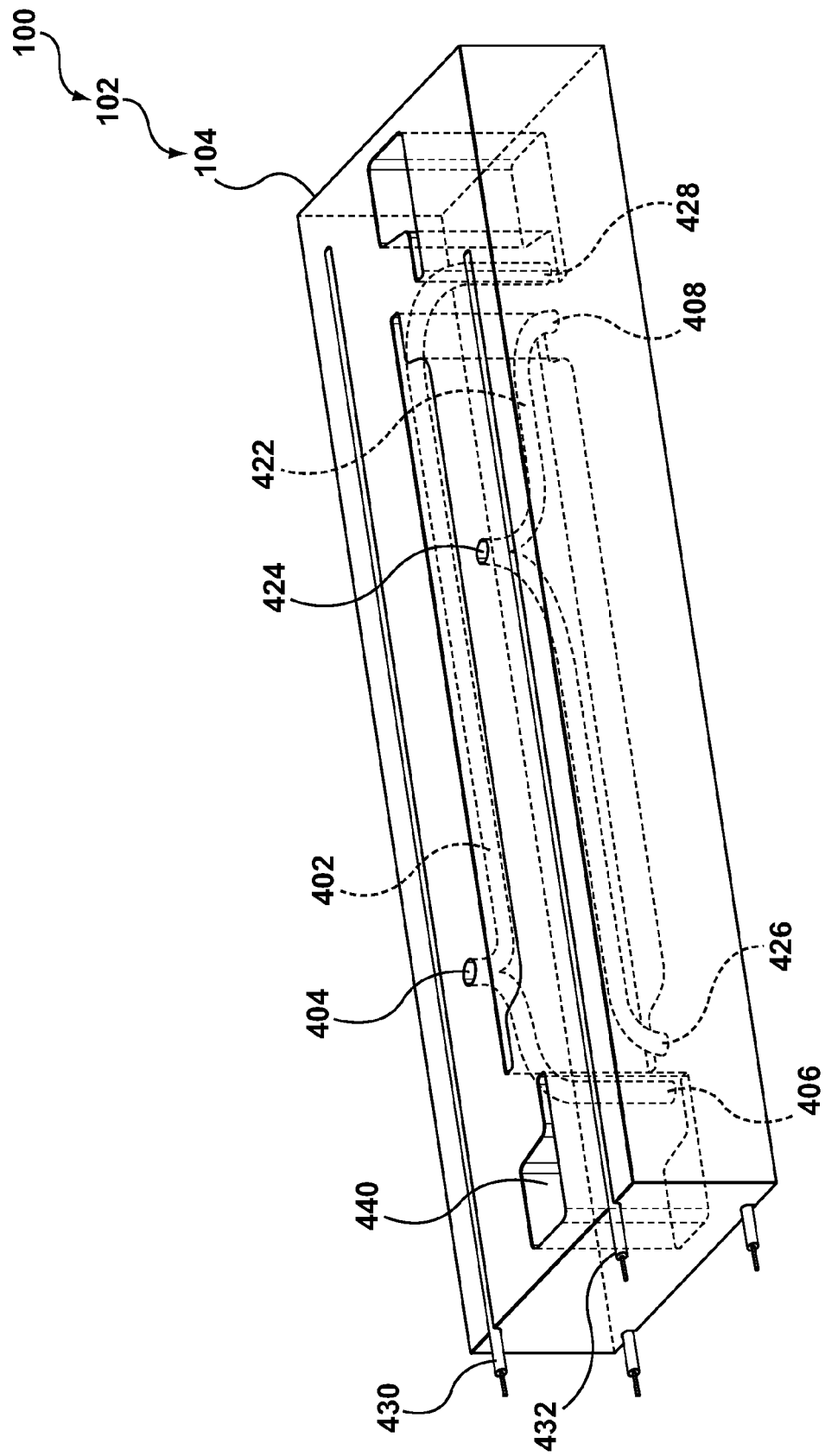
Figure 6B:
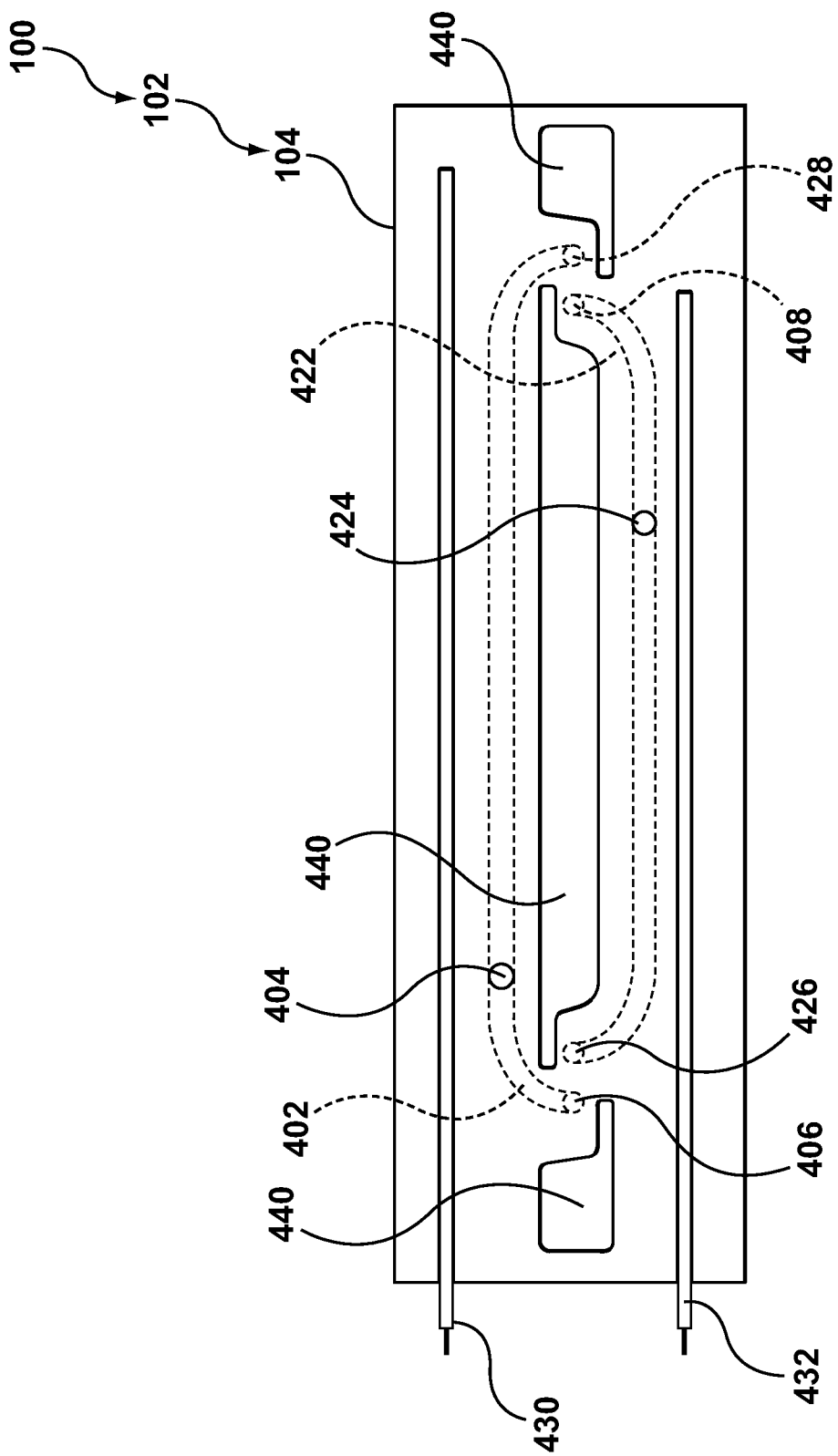

Referring to FIG. 6A, the manifold body (104) is depicted in perspective view. Referring to FIG. 6B, the manifold body (104) is depicted in cross sectional view.

The manifold body (104) of the manifold assembly (102) defines a first-resin melt channel (402) and a second-resin melt channel (422). The first-resin melt channel (402) extends from an entrance (404) to a first exit (406) and a second exit (408); that is, the first-resin melt channel (402) is bifurcated (that is, generally split in to multiple paths as may be required). The second-resin melt channel (422) extends from an entrance (424) to a first exit (426) and a second exit (428); that is, the second-resin melt channel (422) is bifurcated (that is, generally split in to multiple paths as may be required). The second-resin melt channel (422) extends from an entrance (424) to a first exit (426) and a second exit (428); that is, the second-resin melt channel (422) is bifurcated. The first-resin melt channel (402) is used to feed a first type of resin to a mold cavity while the second-resin melt channel (422) is used to feed a second type of resin to the mold cavity (not depicted in FIGS. 6A and 6B). By way of example, the first type of resin may be virgin resin and the second type of resin may be recycled resin. The first exit (406) of the first-resin melt channel (402) and the first exit (426) of the second-resin melt channel (422) are located proximate to each other so as to feed a multi-material nozzle (not depicted in FIG. 6A or FIG. 6B). A first manifold heater (430) and a second manifold heater (432) are connected to the manifold body (104). The first manifold heater (430) is used to heat the resin being transported by the first-resin melt channel (402). The second manifold heater (432) is used to heat the resin being transported by the second-resin melt channel (422). The manifold body (104) defines a void (440), that is, at least one void or more. The void (440), by way of example, extends through the manifold body (104). It will be appreciated that the void (440) may be any shape that is suitable, such as the void may extend vertically through the manifold body (104). The manifold body (104) of the manifold assembly (102) is made of a metal alloy that is configured to: (i) receive a first type of hot melt (that is, a hot molding material) at a first-operational temperature (such as, 300 degrees Celsius) from a first melt source, such is not depicted but is connected to the entrance (404), and (ii) receive a second type of hot melt (that is the second type of hot melt is different from the first type of hot melt) at a second-operational temperature (such as, 240 degrees Celsius) from a second melt source, which is not depicted but which is connected to the entrance (424). The first-resin melt channel (402) and the second-resin melt channel (422) divide or split into multiple channels and distribute their respective hot resins to their respective first exits (406, 426) and second exits (408, 428). The hot resins are substantially maintained at their optimal processing temperatures by means of the first manifold heater (430) and the second manifold heater (432).

Additionally, vertically-extending voids (440) are configured in the manifold body (104) to substantially thermally isolate the first-melt channel (402) from the melt channel (422). While the manifold body (104) may be made of one piece of material, the two hot resins within the first-resin melt channel (402) and the channel (422) are kept at substantially different processing temperatures. This arrangement reduces problems due to overheating and degrading the first type of resin while maintaining the temperature requirements for the second type of resin.

Figure 7A:
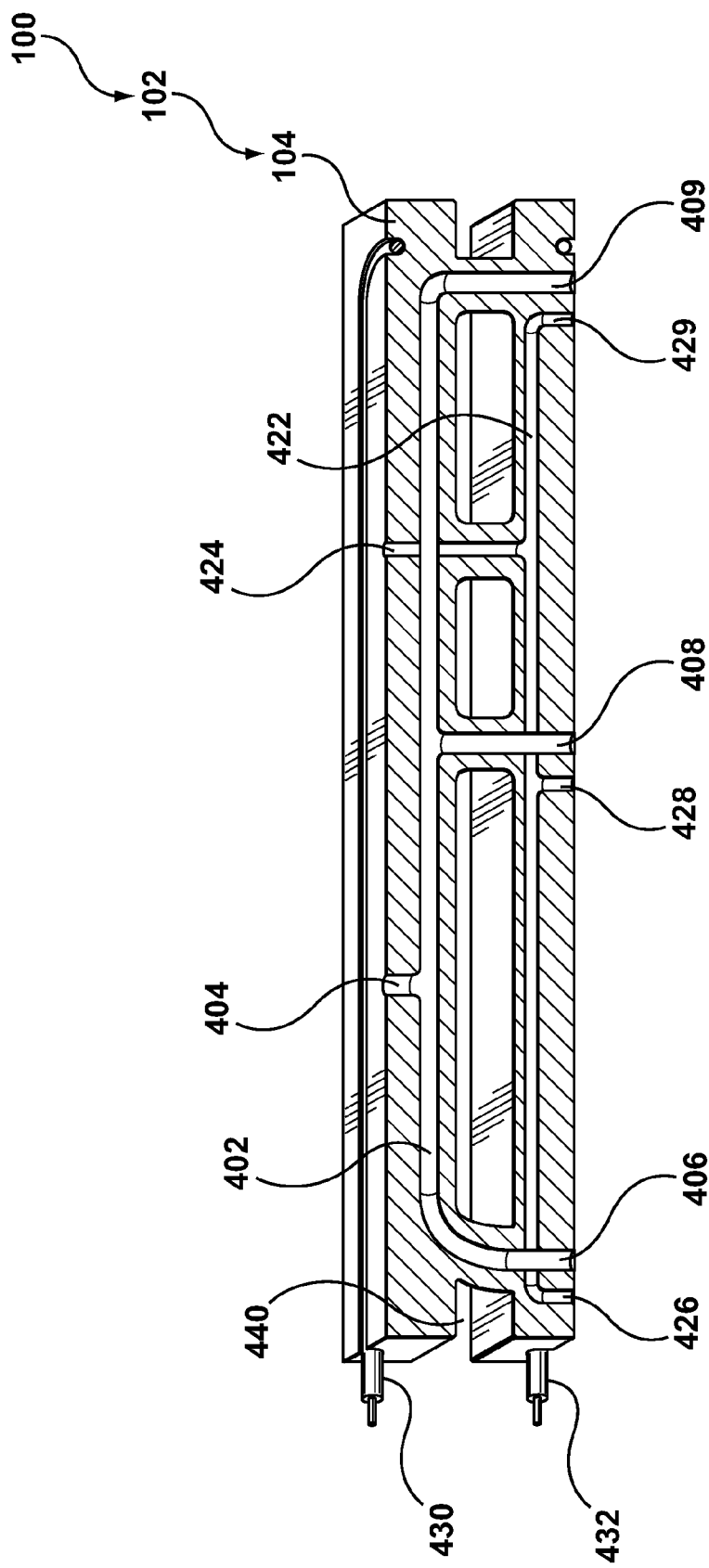
Figure 7B:
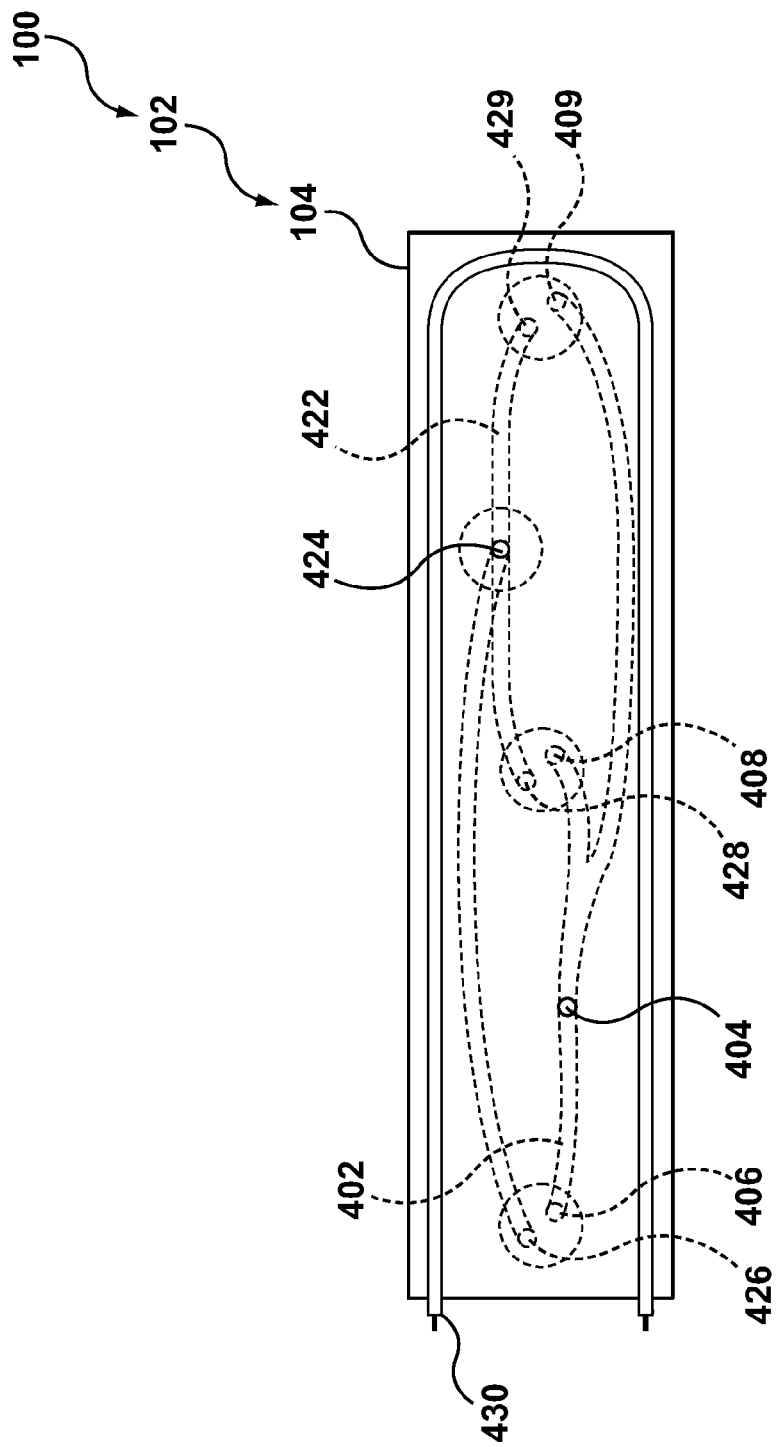

FIGS. 7A and 7B depict another example of the manifold body (104). FIG. 7A depicts a cross-sectional view. FIG. 7B depicts a top view. The void (440) is depicted as extending along a horizontal direction instead of along a vertical direction or arrangement, thereby providing additional melt channel flow path flexibility if so required. The first manifold heater (430) and the second manifold heater (432) are provided at a top and a bottom of the manifold body (104) to keep each hot resin substantially at its own operating temperature before the resins exit the manifold body (104). The manifold body (104) is depicted as defining three respective exits (406, 408, 409, 426, 428, 429) for each of the first- and second-resin melt channels (402, 422).

Figure 8:
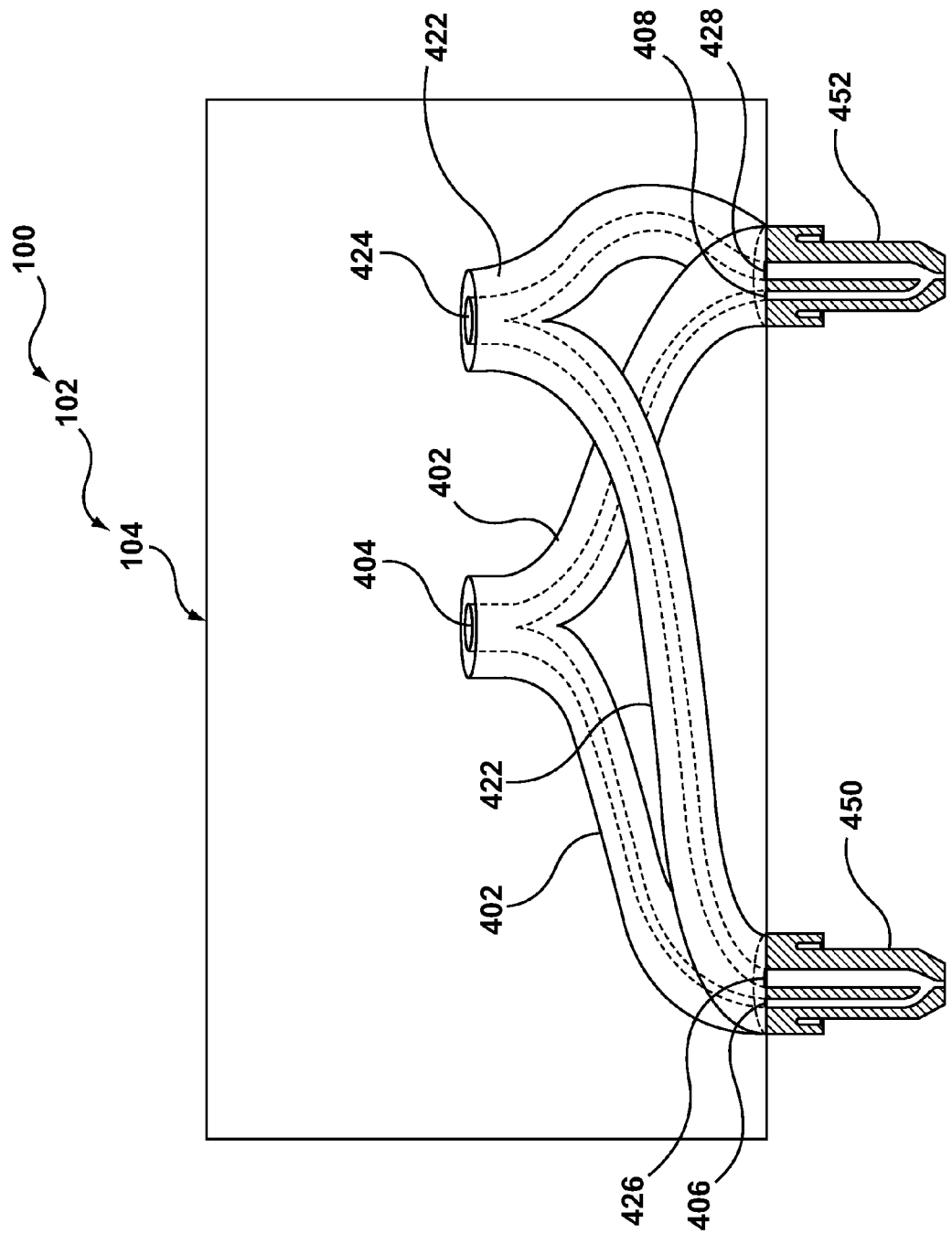

FIG. 8 depicts a perspective view of another example of the manifold body (104) that is configured to connect to multi-material nozzles (450, 452). The manifold body (104) is configured so that the resin melt channels (402, 422) is surrounded by a limited amount of a metal alloy so as to maintain the integrity of the second-resin melt channel (402, 422) for the purpose of heating and injection of the hot resin. The manifold body (104) may be heated using a conformal heating element, layered or attached to the outside surface of the resin melt channels (402, 422). The heating element is not depicted but is known in the art. The conduits that shape or surround the resin melt channels (402, 422) meet (interface) at a nozzle base of respective multi-material nozzles (450, 452), and issue resin to the respective nozzle melt channels at substantially the ideal processing temperature associated with respective types of resins being conveyed in the resin melt channels (402, 422).

It is noted that the foregoing has outlined some of the more pertinent non-limiting embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed non-limiting embodiments can be effected without departing from the spirit and scope of the invention. The described non-limiting embodiments ought to be construed to be merely illustrative of some of the more prominent features and applications of the invention. Other beneficial results can be realized by applying the disclosed invention in a different manner or modifying the invention in ways known to those familiar with the art. This includes the mixing and matching of features, elements and/or functions between various non-limiting embodiments is expressly contemplated herein, unless described otherwise, above.

What is claimed is:

1. A hot-runner system, comprising:
    a manifold assembly, including a one-piece manifold body defining:
        a smooth-flowing, direction changing and uninterrupted melt channel having an elongate contoured-melt channel portion along which the cross sectional profile of the melt channel varies;
        a melt-channel inlet; and
        melt-channel outlets in fluid communication with the melt-channel inlet via the melt channel.

2. The hot-runner system of claim 1, wherein the one-piece manifold body is manufactured, at least in part, in accordance with a free-form fabrication process.

3. The hot-runner system of claim 1, wherein at least one of the melt-channel inlet and the melt-channel outlets have a curved centerline axis.

4. The hot-runner system of claim 1, wherein the melt-channel outlet is offset from the melt-channel inlet, the melt channel extending, at least in part, between the melt-channel inlet and the melt-channel outlet.

5. The hot-runner system of claim 1, wherein the melt channel is plugless.

6. The hot-runner system of claim 1, wherein the one-piece manifold body includes a functionally-graded material.

7. The hot runner system of claim 1, wherein the one-piece manifold body defines an outer surface having a contoured shape.

8. The hot-runner system of claim 1, wherein the one-piece manifold body defines a selected hot-runner component.

9. The hot-runner system of claim 1, wherein the one-piece manifold body includes at least one of:
    a sprue structure integrally formed with the one-piece manifold body; and
    a nozzle integrally formed with the one-piece manifold body.

10. The hot-runner system of claim 1, wherein the one-piece manifold body includes a convoluted melt-channel geometry.

11. The hot-runner system of claim 1, wherein the one-piece manifold body includes a component captured within the one-piece manifold body.

12. The hot-runner system of claim 1, wherein the one-piece manifold body includes a moving component captured within the one-piece manifold body.

13. The hot-runner system of claim 1, wherein the melt channel includes a tapered channel wall.

14. The hot-runner system of claim 1, wherein the melt channel includes a centerline axis with a curve having a radius greater than the diameter of the melt channel.

15. The hot-runner system of claim 1, wherein the melt channel includes a channel wall having contours which, in use, mixes a melt flow when a melt is made to flow through the melt channel.

16. The hot-runner system of claim 12, wherein the moving component is a ball of a check valve.

17. The hot-runner system of claim 1, wherein the melt channel has a diameter that is less than or equal to 4 mm and has a length of at least 50 times 4 mm.

18. The hot-runner system of claim 1, wherein the one-piece manifold body forms a void configured to alter a thermal uniformity of the manifold body.

19. The hot-runner system of claim 1, wherein the one-piece manifold body is configured to:
    (i) receive a first type of hot melt at a first-operational temperature from a first melt source, and
    (ii) receive a second type of hot melt at a second-operational temperature from a second melt source,
        the melt channel is a first-resin melt channel,
        the one-piece manifold body further defines a second-resin melt channel, the first-resin melt channel and the second-resin melt channel divide or split into multiple channels and distribute their respective hot resins to their respective first exits and second exits,
        the hot resins are substantially maintained at their optimal processing temperatures by means of a first manifold heater and a second manifold heater, and
        the one-piece manifold body defines a void configured in the one-piece manifold body to substantially thermally isolate the first-resin melt channel from the second-resin melt channel.

20. The hot-runner system of claim 1, wherein:
    the manifold body is configured to connect to multi-material nozzles,
    the manifold body is configured so that resin melt channels are surrounded by an amount of a metal alloy so as to maintain integrity of a second-resin melt channel for heating and injection of a hot resin, and
    conduits that shape or surround the resin melt channels meet at a nozzle base of the multi-material nozzles.

* * * * *